Patented Nov. 28, 1933

1,936,948

UNITED STATES PATENT OFFICE 1,936,948

CONDENSATION PRODUCTS OF THE ANTHRAQUINONE SERIES

Paul Nawiasky, Ludwigshafen-on-the-Rhine, and Berthold Stein, Mannheim, Germany, assignors to General Aniline Works, Inc., New York, N. Y., a corporation of Delaware No Drawing. Application February 17, 1931, Serial No. 516,506, and in Germany February 26, 1930

5 Claims. (Cl. 260—60)

The present invention relates to new condensation products of the anthraquinone series which are considered to be 1-amino-2.1'-dianthrimides substituted in the amino group by an aromatic dicarboxylic acid radicle and which are saponifiable to the free amines.

We have found that new condensation products of the anthraquinone series which are especially important as initial materials for the manufacture and production of dyestuffs are obtained by condensing a 1-amino-2-halogenanthraquinone in which both of the hydrogen atoms of the amino group are replaced by the carbonyl groups of an aromatic dicarboxylic acid capable of forming a monomolecular anhydride, with a 1-amino-anthraquinone.

Aromatic dicarboxylic acids of the aforesaid kind comprise, for example, phthalic acid, naphthalic acid, naphthalene-1.2- and 2.3-dicarboxylic acid and derivatives of the said acids. The compounds produced in this manner in practically quantitative yields are 1-amino-2.1'-dianthrimides substituted in the amino group by an aromatic dicarboxylic radicle corresponding to the formula:

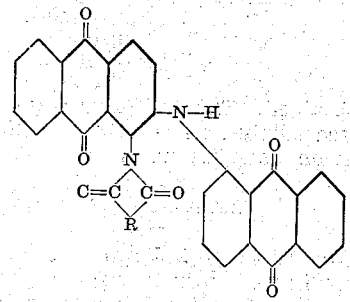

in which the anthraquinone nuclei may be substituted and wherein R is an aromatic radicle in which the two C=O groups are attached in such positions that the corresponding dicarboxylic acid is capable of forming a monomolecular anhydride.

In order to produce from these imino-dianthrimides dyestuffs of the type of N-dihydro-1.2.2'.1'-anthraquinoneazine, the aromatic dicarboxylic acid radicle must be split off. If attempts, however, are made to split the dicarboxyl acid radicle off again this does not take place in the usual manner by employing strongly acid or strongly alkaline saponifying agents.

We have now found that the dicarboxylic acid radicle may be split off from the said condensation products by treating them with ammonia, its substitution products or similar agents having a mild alkaline action, such as for example alkali metal phenolates, while heating. The 1.2-diamino-anthraquinones substituted in the nitrogen atom in the 2-position thus obtained are usually coloured substances and are readily condensed according to known methods to form dyestuffs of the N-dihydro-1.2.2'.1'-anthraquinoneazine series.

The following examples will further illustrate the nature of this invention, but the invention is not restricted to these examples. The parts are by weight.

Example 1

43 parts of 1-phthalimino-2-bromanthraquinone (obtainable for example by heating 1-amino-2-bromanthraquinone with phthalic anhydride) are boiled in 300 parts of nitrobenzene with 23 parts of 1-aminoanthraquinone, 15 parts of anhydrous sodium acetate and 0.5 part of copper acetate until 1-aminoanthraquinone can no longer be detected. The reaction mixture is allowed to cool, is filtered by suction and the residue is treated with steam. A reaction product free from halogen which forms large dark red crystals and which dissolves in concentrated sulphuric acid giving a deep blue colouration is obtained in excellent yields. The compound, after crystallization from nitrobenzene, contains 75.5 per cent of carbon
3.3 per cent of hydrogen and
5.0 per cent of nitrogen according to analysis. These values agree very well with the calculated values for 1-phthalimino-2.1'-dianthrimide, viz:—

75.2 per cent of carbon
3.2 per cent of hydrogen and
4.9 per cent of nitrogen.

Example 2

110 parts of 1-phthalimino-2-bromanthraquinone and 85 parts of 1-amino-5-benzoylaminoanthraquinone with an addition of 40 parts of sodium acetate and 1 part of copper acetate are heated to boiling in 750 parts of nitrobenzene for some hours. After cooling, the red crystals which have separated out are filtered off by suction and the residue is washed with nitrobenzene, ethyl alcohol and water. In this manner 1-phthalimino-5′-benzoylamino-2.1′-dianthrimide corresponding to the formula:

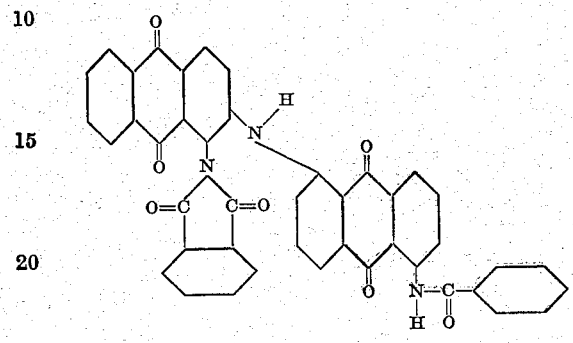

is obtained in a good yield in the form of copper red crystals. It dissolves in sulphuric acid giving a dull violet colouration.

*Example 3*

By replacing the 1-amino-5-benzoylaminoanthraquinone in Example 2 by 65 parts of 1-amino-4-methoxyanthraquinone, 1-phthalimino-4′-methoxy-2.1′-dianthrimide corresponding to the formula:

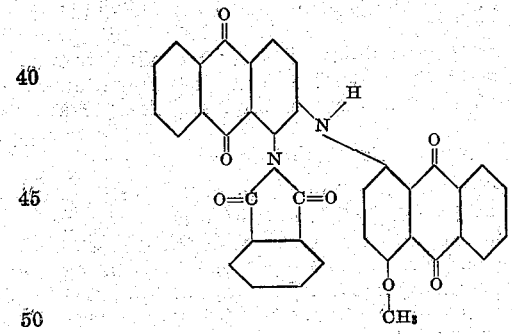

is formed in a practically quantitative yield and separates from the solution in the form of lustrous violet rhombic crystals when cooled. It dissolves in concentrated sulphuric acid giving a deep blue colouration.

*Example 4*

5.5 parts of 5.5′-diaminodiphthaloylcarbazole obtainable by warming 5.5′-dibenzoylimino-1.1′-dianthrimide in chlorosulphonic acid and saponifying the resulting product by means of sulphuric acid, are heated while stirring with 11 parts of 1-phthalimino-2-bromanthraquinone, 4 parts of sodium acetate and 0.1 part of copper acetate in 100 parts of boiling nitrobenzene until unchanged 5.5′-diaminodiphthaloylcarbazole can no longer be detected. The new condensation product, which is very difficulty soluble even in hot nitrobenzene, separates out during the reaction in the form of fine brown violet needles. The reaction product is worked up and isolated in the usual manner. The new compound probably corresponding to the formula:

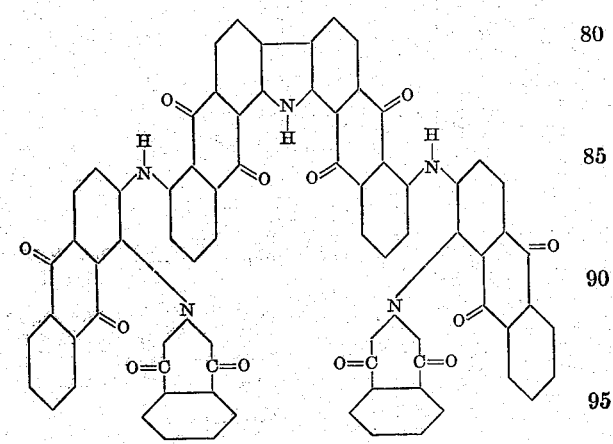

dissolves in concentrated sulphuric acid giving a green blue colouration.

*Example 5*

65 parts of 1-amino-3-chloroanthraquinone are heated to boiling with 110 parts of 1-phthalimino-2-bromoanthraquinone, 1 part of copper acetate, 40 parts of anhydrous sodium acetate and 500 parts of nitrobenzene until the initial materials cannot anymore be detected. The reaction mixture is allowed to cool, the precipitate filtered off and freed from solvent and inorganic components. Large brown orange crystals of a product corresponding to the formula:

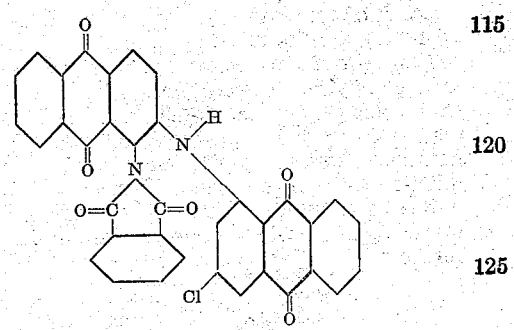

are thus obtained. The new product dissolves in concentrated sulphuric acid to give a blue solution which on warming turns yellow.

*Example 6*

220 parts of 1-phthalimino-2-bromanthraquinone are heated to boiling for several hours with 165 parts of 1-amino-3-benzoylanthraquinone (obtainable by eliminating the amino group from 1-bromo-4-aminoanthraquinone-3-carboxylic acid, converting the resulting product by means of thionylchloride into the acid chloride, condensing the latter with benzene with the aid of aluminium chloride and replacing the bromine atom by an amino group by heating with ammonia under pressure), 75 parts of sodium acetate and 3 parts of copper acetate in 1000 parts of nitrobenzene. The precipitate is filtered off and freed from solvent and inorganic components in the usual manner. The 1-phthalimino-3'-benzoyl-2.1'-dianthrimide thus obtained corresponds to the formula:

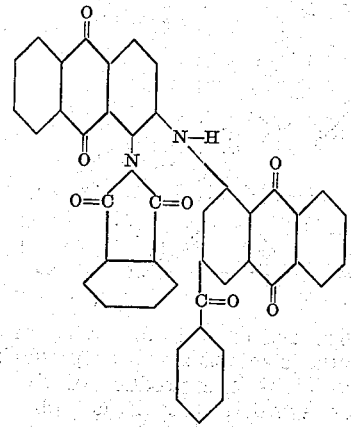

It forms beautiful, uniform red crystals dissolving in concentrated sulphuric acid to give a deep blue solution which on standing changes its color to a pure yellow.

*Example 7*

50 parts of the condensation product from 1-phthalimino-2-bromanthraquinone and 1-aminoanthraquinone prepared according to Example 1 are heated for 6 hours at 180° C. with 1000 parts of 20 per cent ammonia in an iron autoclave. After cooling, the product is filtered off by suction and washed with water. 1-amino-2.1'-dianthrimide is obtained in good yields in the form of fine currant brown needles.

*Example 8*

10 parts of the dianthrimide obtainable by the condensation of 1-aminoanthraquinone-3-carboxylic acid ethyl ester with 1-phthalimino-2-bromanthraquinone (forming brown red crystals dissolving in concentrated sulphuric acid to give a blue solution) are heated for a short time to from 100° to 120° C. while stirring with 2 parts of hydrazine hydrate in 50 parts of nitrobenzene. In this manner, with temporary dissolution and simultaneous splitting off of the phthaloyl radicle, the red crystals change into violet needles. After cooling, the needles are filtered off by suction, treated with steam and boiled with dilute caustic soda solution to remove the hydrazine salt formed. The ethyl ester of 1-amino-2.1'-dianthrimide-3'-carboxylic acid thus obtainable which corresponds to the formula:

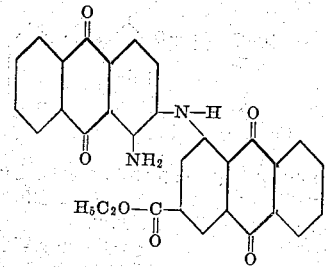

dissolves in concentrated sulphuric acid to give a steel-blue colouration. When warmed the solution becomes a beautiful yellow green colour.

*Example 9*

10 parts of the condensation product from 1-phthalimino-2-bromanthraquinone and 1-amino-4.para-toluidoanthraquinone are heated in 100 parts of nitrobenzene together with 6 parts of ethylene diamine hydrate for a short time to from 160° to 180° C. under a reflux condenser while stirring. When the reaction mixture is cooled, 1-amino-4'.para-toluido-2.1'-dianthrimide corresponding to the formula:

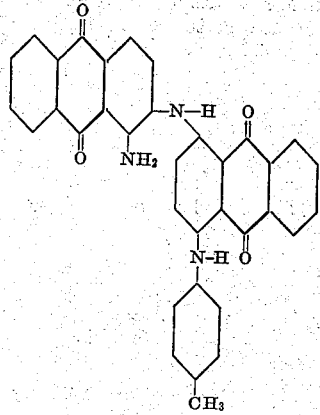

separates out in the form of green blue needles. The working up is carried out as described in Example 8. The new compound dissolves in concentrated sulphuric acid to give a blue colouration.

*Example 10*

12 parts of the condensation product from 1-phthalimino-2-bromanthraquinone and 1-aminoanthraquinone are suspended in 120 parts of nitrobenzene and 5 parts of potassium phenolate are added. The whole is then heated to from 150° to 160° C. while stirring well, whereby the splitting off of the phthaloyl radicle takes place in a short time. The working up is carried out as described in Example 8.

*Example 11*

10 parts of the condensation product from 2 molecular proportions of 1-phthalimino-2-bromanthraquinone and 1 molecular proportion of 4.4'-diaminodiphthaloylcarbazole are heated to boiling in 300 parts of nitrobenzene with 5 parts of hydrazine hydrate until the completion of the saponification. This may be ascertained when from a sample a product separates out on cooling giving a dull blue solution in concentrated sulphuric acid even when warmed, in contradistinction to the initial material the blue colouration of the solution of which in sulphuric acid changes to yellow when warmed. The whole is then allowed to cool and the product which probably corresponds to the formula:

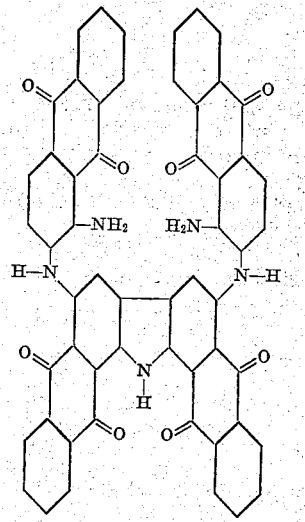

What we claim is:—

1. Condensation products of the anthraquinone series which are probably 1-imino-2.1'-dianthrimides corresponding to the formula:

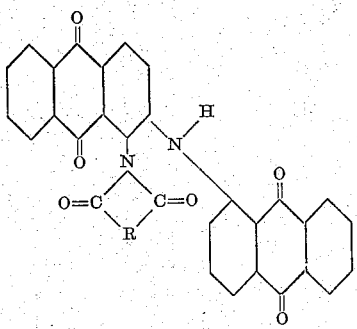

in which the anthraquinone nuclei may be substituted by a substituent selected from the group consisting of halogen, the amino, benzoylamino, toluido, benzoyl, alkyloxy, carboxylic acid including esterified carboxylic acid groups and members of a carbazol nucleus, and wherein R is a benzene or a naphthalene radicle to which the two C=O groups are attached in such positions that the corresponding dicarboxylic acid is capable of forming a monomolecular anhydride.

2. Condensation products of the anthraquinone series which are probably 1-phthalimino-2.1'-dianthrimides corresponding to the formula:

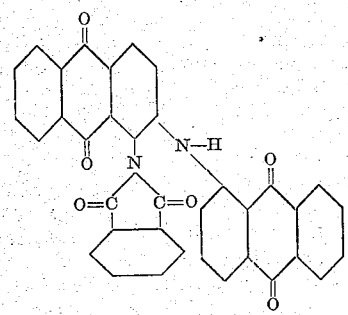

in which the anthraquinone nuclei may be substituted by a substituent selected from the group consisting of halogen, the amino, benzoylamino, toluido, benzoyl, alkyloxy, carboxylic acid including esterified carboxylic acid groups and members of a carbazol nucleus.

3. The condensation product of the anthraquinone series which probably is 1-phthalimino-2.1'-dianthrimide corresponding to the formula:—

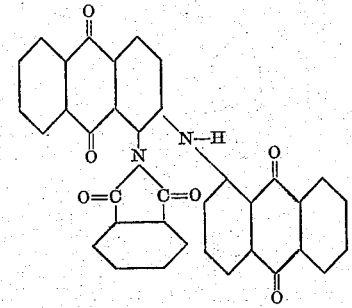

forming dark red crystals dissolving in concentrated sulphuric acid to give a deep blue solution.

4. The condensation product of the anthraquinone series which probably is 1-phthalimino-3'-benzoyl-2.1'-dianthrimide corresponding to the formula:

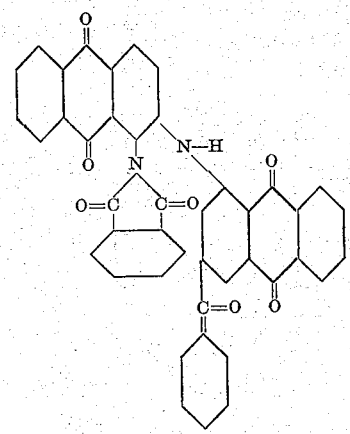

forming uniform red crystals dissolving in concentrated sulphuric acid to give a deep blue solution which on standing changes its color to a pure yellow.

5. The condensation product of the anthraquinone series which probably is 1-phthalimino-3'-chloro-2.1'-dianthrimide corresponding to the formula:

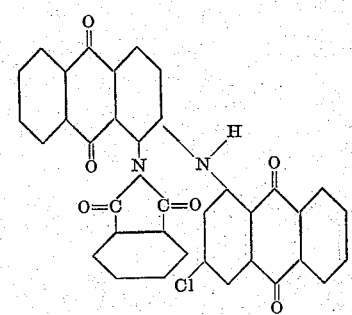

forming brown orange crystals dissolving in concentrated sulphuric acid to give a blue solution which on warming turns yellow.

PAUL NAWIASKY.
BERTHOLD STEIN.